(12) United States Patent
Westerink (10) Patent No.: US 8,322,670 B2
(45) Date of Patent: Dec. 4, 2012

(54) DEPLOYMENT APPARATUSES

(75) Inventor: Rik Westerink, Corinth, TX (US)

(73) Assignee: Weber Aircraft LLC, Gainesville, TX (US)

( * ) Notice: Subject to any disclaimer, the term of this patent is extended or adjusted under 35 U.S.C. 154(b) by 223 days.

(21) Appl. No.: 12/750,205

(22) Filed: Mar. 30, 2010

(65) Prior Publication Data
US 2010/0243839 A1 Sep. 30, 2010

Related U.S. Application Data

(60) Provisional application No. 61/164,530, filed on Mar. 30, 2009.

(51) Int. Cl.
*E04G 3/00* (2006.01)
(52) U.S. Cl. ............... 248/276.1; 248/285.1; 248/286.1; 248/287.1; 16/363; 16/365; 297/188.17
(58) Field of Classification Search ............... 248/276.1, 248/285.1, 286.1, 287.1, 296.1; 16/362, 16/363, 365; 297/188.17; 296/26.09
See application file for complete search history.

(56) References Cited

U.S. PATENT DOCUMENTS

| 4,534,278 | A | * | 8/1985 | Spilde | 454/322 |
| 5,076,524 | A | * | 12/1991 | Reh et al. | 248/296.1 |
| 5,179,447 | A | | 1/1993 | Lain | |
| 5,398,991 | A | | 3/1995 | Smith et al. | |
| 5,695,417 | A | * | 12/1997 | Winter et al. | 473/484 |
| 5,732,919 | A | | 3/1998 | Rosen et al. | |
| 6,179,263 | B1 | * | 1/2001 | Rosen et al. | 248/278.1 |
| 6,288,891 | B1 | * | 9/2001 | Hasegawa et al. | 361/679.07 |
| 6,453,511 | B2 | * | 9/2002 | Sato | 16/360 |
| 6,517,040 | B1 | * | 2/2003 | Wen | 248/278.1 |
| 7,047,600 | B2 | * | 5/2006 | Muir | 16/366 |
| 7,320,652 | B2 | * | 1/2008 | Kilpatrick | 473/483 |

(Continued)

FOREIGN PATENT DOCUMENTS
DE 202007015886 1/2008
(Continued)

OTHER PUBLICATIONS

International Search Report and Written Opinion dated Feb. 4, 2011 in related Application No. PCT/US2010/029147.

(Continued)

*Primary Examiner* — Terrell McKinnon
*Assistant Examiner* — Daniel J Breslin
(74) *Attorney, Agent, or Firm* — Dean W. Russell; Tiffany L. Williams; Kilpatrick Townsend & Stockton LLP (57) ABSTRACT

Embodiments of the present invention include a deployment apparatus comprising a deployment object, a deployment arm, a deployment link, a pivot housing, at least two linear guides, and a gas spring. The deployment object is coupled to the deployment arm, which is pivotally coupled to the deployment link. An opposing end of the deployment link is fixedly coupled to a structure. The pivot housing is adjacent the connection between the deployment link and the deployment arm. The pivot housing is slidingly engaged with the at least two linear guides. The gas spring is coupled to the pivot housing, which pushes the pivot housing to an upper end of the at least two linear guides and causes the deployment link to rotate the deployment arm from a stowed angle to a released angle and results in a displaced vertical distance.

7 Claims, 7 Drawing Sheets

U.S. PATENT DOCUMENTS

| | | | |
|---|---|---|---|
| 7,335,119 B2 * | 2/2008 | White | 473/483 |
| 7,408,596 B2 * | 8/2008 | Kunz | 348/837 |
| 7,537,188 B2 * | 5/2009 | Root et al. | 248/295.11 |
| 8,032,989 B2 * | 10/2011 | Liang et al. | 16/362 |
| 8,062,152 B2 * | 11/2011 | Nye et al. | 473/484 |
| 2006/0219857 A1 | 10/2006 | Satterfield | |
| 2009/0077897 A1 * | 3/2009 | Liang et al. | 49/397 |
| 2011/0157781 A1 * | 6/2011 | Peng | 361/679.01 |

FOREIGN PATENT DOCUMENTS

| | | |
|---|---|---|
| WO | WO-2010117758 A2 | 10/2010 |

OTHER PUBLICATIONS

Communication dated Aug. 16, 2012 in European Patent Application No. 10722846.2.

* cited by examiner

DEPLOYMENT APPARATUSES

CROSS REFERENCE TO RELATED APPLICATIONS

This application is related to and claims priority benefits from U.S. Provisional Application Ser. No. 61/164,530, filed on Mar. 30, 2009, entitled TRANSLATING VIDEO DEPLOYMENT MECHANISM. The '530 application is hereby incorporated in its entirety by this reference.

FIELD OF THE INVENTION

The field of the invention relates to deployment apparatuses for passenger seats or the like.

BACKGROUND

Many vehicle seats such as those on passenger aircraft, buses, trains and the like require stowage of objects when not in use. For example, many seat designs utilize the space below the seat cross beams to stow video devices, tray tables, cocktail tables, and the like. In many instances, the swing trajectory of these objects requires additional storage length or the size of the object must be limited to properly stow within the existing storage available.

In certain situations, however, it may be desirable to reduce the size of the storage compartment or to increase the size of the deployment object. In these circumstances, there exists a need to limit the swing trajectory arc required to stow these objects.

SUMMARY

Embodiments of the present invention include a deployment apparatus comprising a deployment object, a deployment arm, a deployment link, a pivot housing, at least two linear guides, and a gas spring. Deployment objects may include but are not limited to a display monitor, a tray table, and a cocktail table. The deployment object may be coupled to the deployment arm via a deployment connector that is pivotally coupled to the deployment object and rotationally coupled to an end of the deployment arm. The deployment link includes a mating surface that confronts a mating surface of the deployment arm and an opposing end that is coupled in a fixed location to a deployment arm mount. The pivot housing is adjacent the mating surfaces of the deployment link and the deployment arm. The at least two linear guides are coupled to the deployment arm mount and comprise at least two tracks that are slidingly engaged with a plurality of linear bearings on the surface of the pivot housing. Finally, the gas spring is coupled at one end to the pivot housing and coupled at an opposing end to the deployment arm mount.

In some embodiments, the deployment apparatus includes a locking arm that releasably engages a latch pin that is positioned on the deployment arm. Other embodiments of the deployment apparatus may include a spring coupled to an end of the locking arm and a projection on the pivot housing. In yet other embodiments, a rotation limitation pin is coupled to the mating surface of the deployment arm and contacts the deployment link when the deployment arm is positioned between a stowed angle and a released angle.

The deployment apparatus may be deployed by releasing the latch pin from the locking arm. The gas spring is then released, which raises the pivot housing to an upper end of the at least two linear guides. In some embodiments, the deployment arm rotates from a stowed angle to a released angle due to contact between the deployment link and the rotation limiting pin. The deployment apparatus may have a released angle of at least 10 degrees and a displaced vertical distance of at least 0.5 inches.

DETAILED DESCRIPTION

Embodiments of the invention provide deployment mechanisms for use with a vehicle seat. While the deployment mechanisms are discussed for use with aircraft seats, they are by no means so limited. Rather, embodiments of the deployment mechanisms may be used in vehicle seats of any type or otherwise as desired.

FIGS. 1-8 illustrate one embodiment of a deployment apparatus 10. In this embodiment, the deployment apparatus 10 comprises a deployment object 12, a deployment connector 14, a deployment arm 16, a vertical slide 18, and a deployment arm mount 20.

Figure 1:
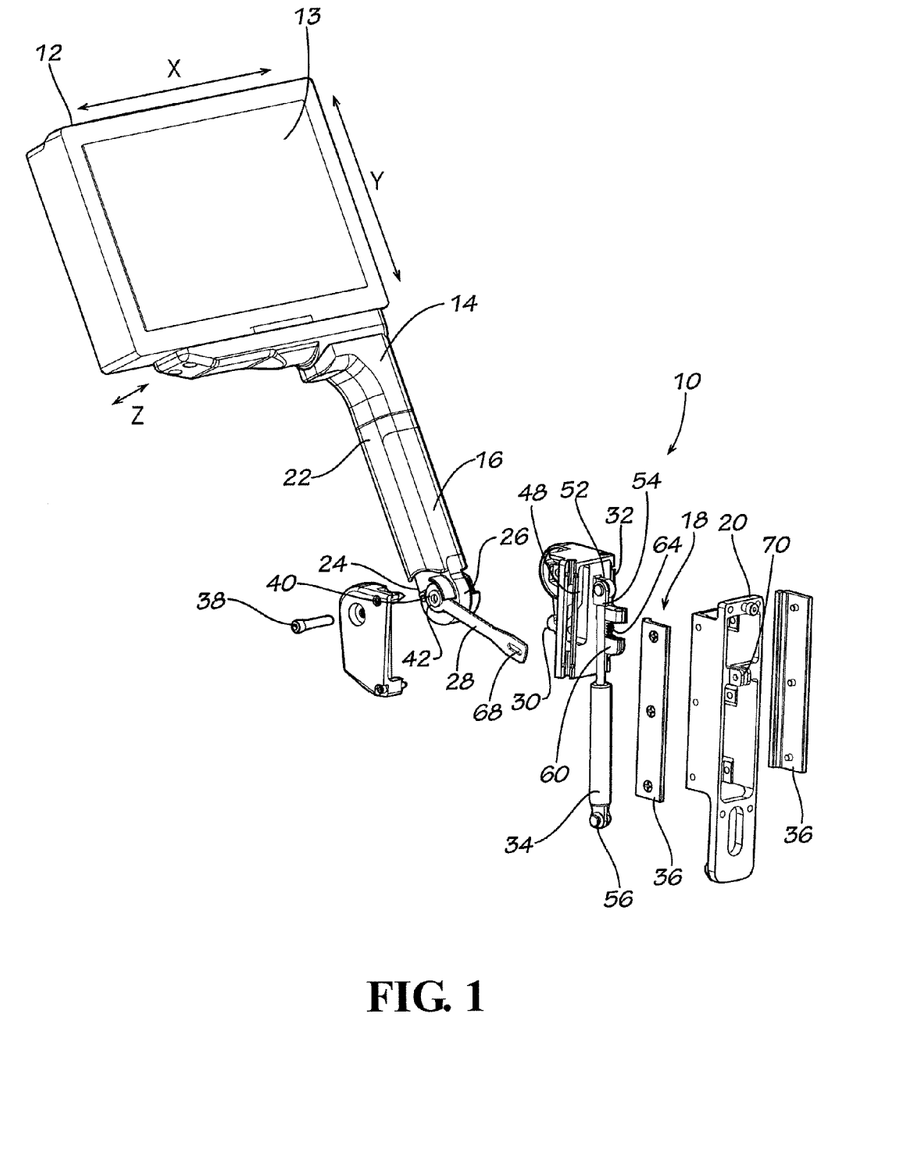
FIG. 1 is an exploded perspective view of a deployment apparatus according to one embodiment of the present invention.
Figure 2:
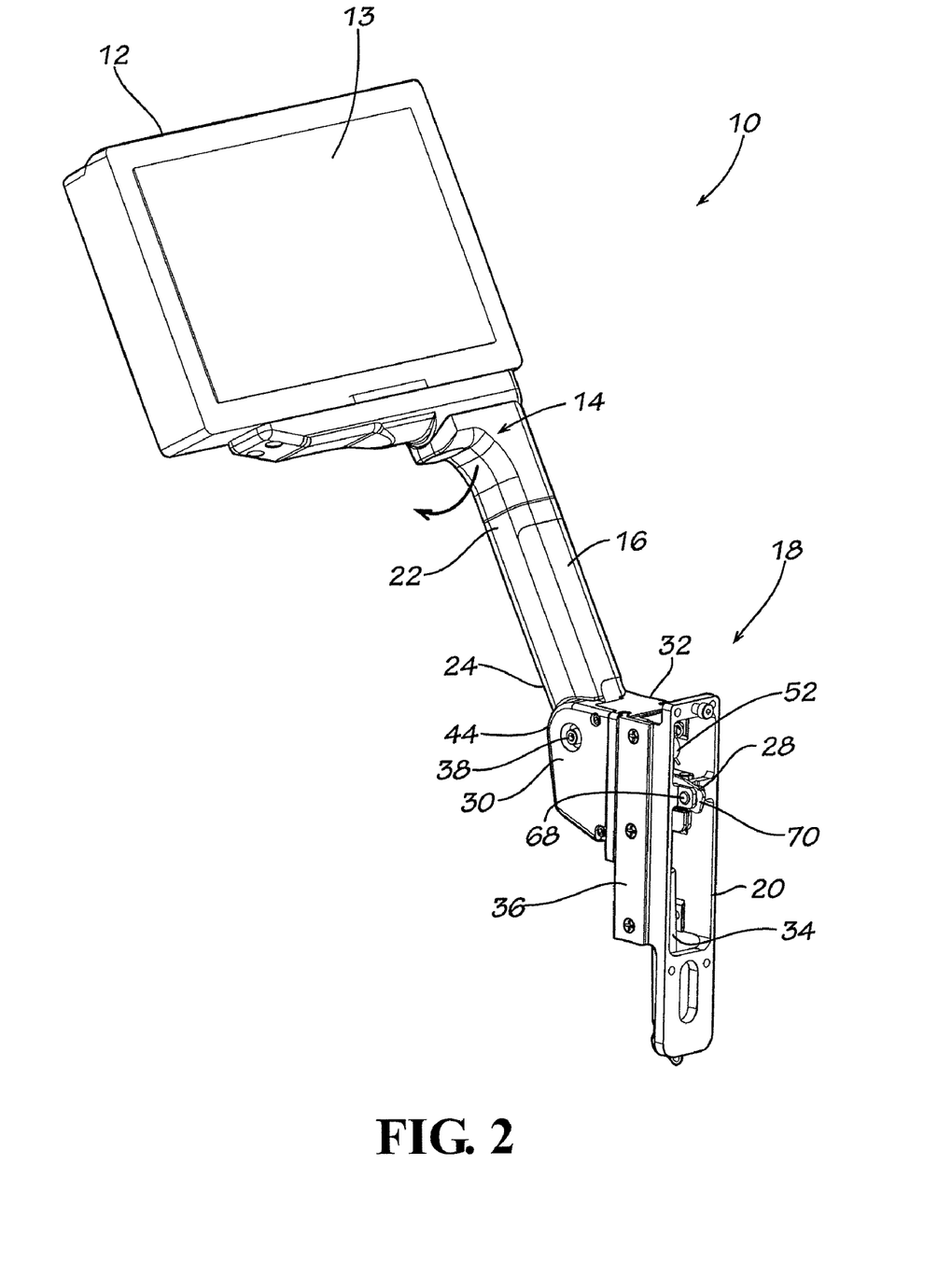
FIG. 2 is an assembled perspective view of the deployment apparatus of FIG. 1.

In some embodiments, as shown in FIGS. 1 and 2, the deployment object 12 is a three-dimensional object having a length X, a height Y, and a depth Z, where the X and Y sides define a surface area 13. The deployment object 12 may be any object including but not limited to any type of screen that displays visual images corresponding to electrical signals that it receives from an appropriate source, a food tray, a cocktail tray, or other similar objects.

The deployment object 12 is pivotally coupled to the deployment connector 14. The deployment connector 14 has any appropriate shape that allows the deployment object 12 to pivot relative to its coupling to the deployment connector 14. In one embodiment, as shown in FIGS. 1-2, the deployment connector 14 includes a rounded seat that is pivotally coupled to at least a portion of the lower length X of the deployment object 12.

FIGS. 1 and 2 illustrate one embodiment of the coupling between the deployment connector 14 and the deployment arm 16. In this embodiment, the deployment connector 14 is coupled to an end 22 of the deployment arm 16 in a manner that allows the deployment connector 14 to rotate relative to the deployment arm 16 along the longitudinal axes of both the deployment connector 14 and the deployment arm 16. Both the deployment connector 14 and the deployment arm 16 may be formed of any suitable material including but not limited to aluminum, stainless steel, other metallic material, composite material, or other similar material. The deployment arm 16 may have any appropriate cross-sectional shape including but not limited to rectilinear, oval, circular, triangular, or any other similar shape. The longitudinal shape of the deployment arm 16 may have a straight, curved, or any other suitable profile.

In some embodiments, an opposing end 24 of the deployment arm 16 includes a pivot 26. The deployment arm 16 is pivotally coupled to the vertical slide 18 via the pivot 26, where the pivot 26 is shaped to allow the deployment arm 16 to pivot relative to the vertical slide 18. The pivot 26 may have a cylindrical, oval, spherical, or other similar shape that allows the pivot 26 to rotate in a suitable manner.

FIGS. 3-8 illustrate one embodiment of the vertical slide 18. In this embodiment, the vertical slide 18 comprises a deployment link 28, a pivot housing 30, a cable cover 32, a gas spring 34, and at least two linear guides 36. In some embodiments, a mating surface of the deployment link 28 confronts a mating surface on the pivot 26. The pivot 26 is coupled to the deployment link 28 by a fastener 38 that passes through an aperture 40 in the pivot 26 and a co-centrically aligned aperture 42 in one end of the deployment link 28. However, the pivot 26 and the deployment link 28 may be coupled by any appropriate manner that allows the pivot 26 and the deployment link 28 to rotate relative to one another.

Figure 3:
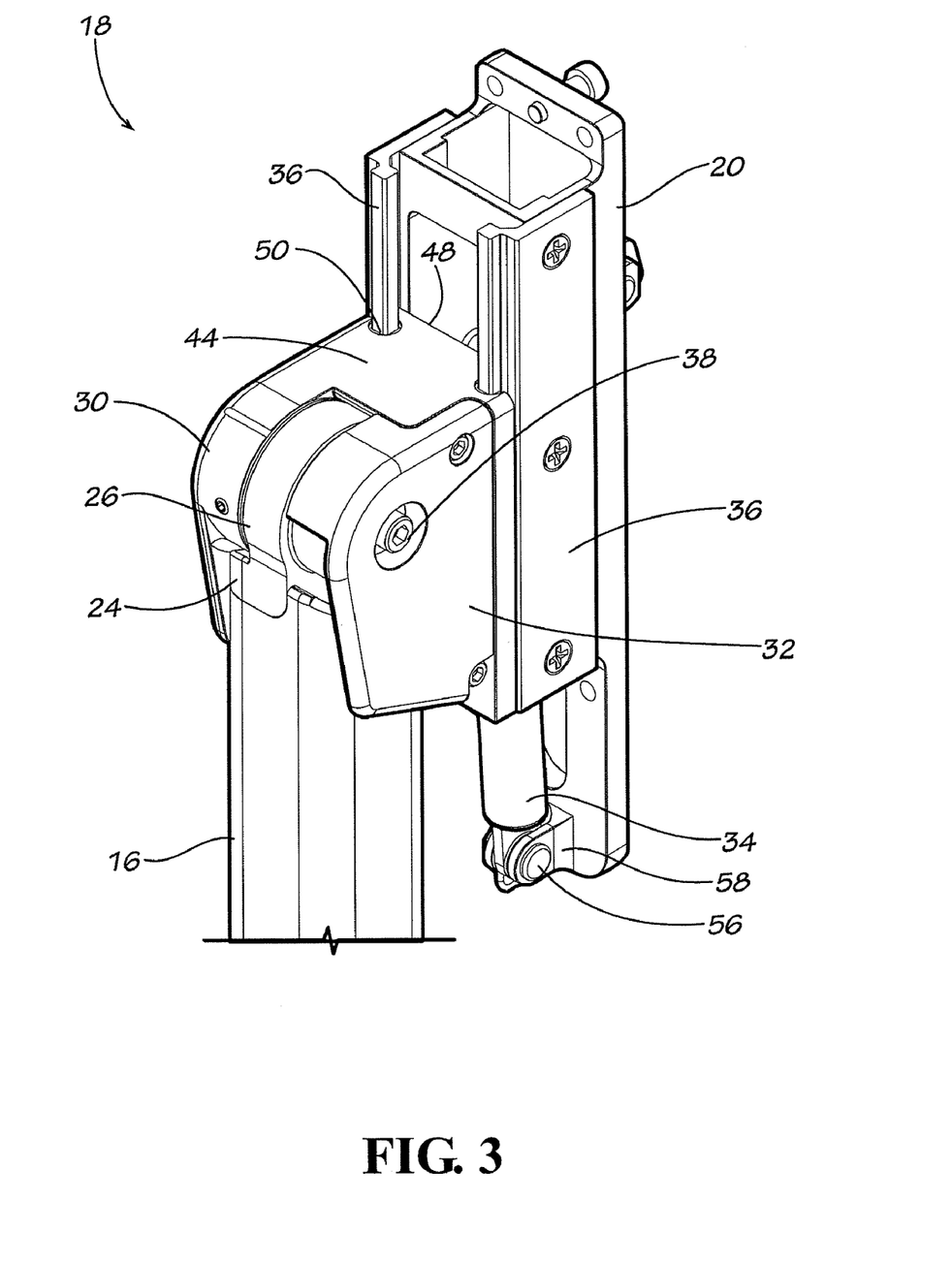
FIG. 3 is a perspective view of the vertical slide mechanism of the deployment apparatus of FIG. 1.

In some embodiments, as shown in FIG. 3, the pivot housing 30 is positioned adjacent one side of the coupled pivot 26 and the deployment link 28, and the cable cover 32 is positioned adjacent the opposing side of the pivot 26 and the deployment link 28. The pivot housing 30 and the cable cover 32 are coupled to one another to form an enclosure 44 surrounding the junction between the pivot 26 and the deployment link 28. The pivot housing 30 and the cable cover 32 may be formed of any suitable material including but not limited to aluminum, stainless steel, other metallic material, composite material, or other similar material.

In one embodiment shown in FIGS. 4-8, the pivot 26 also includes a rotation limiting pin 46. The rotation limiting pin 46 is located on the mating surface of the pivot 26 that confronts the deployment link 28. When the deployment arm 16 is placed in certain orientations relative to the deployment link, the rotation limiting pin 46 is rotated into a position where the rotation limiting pin 46 contacts the deployment link 28.

Figure 4:
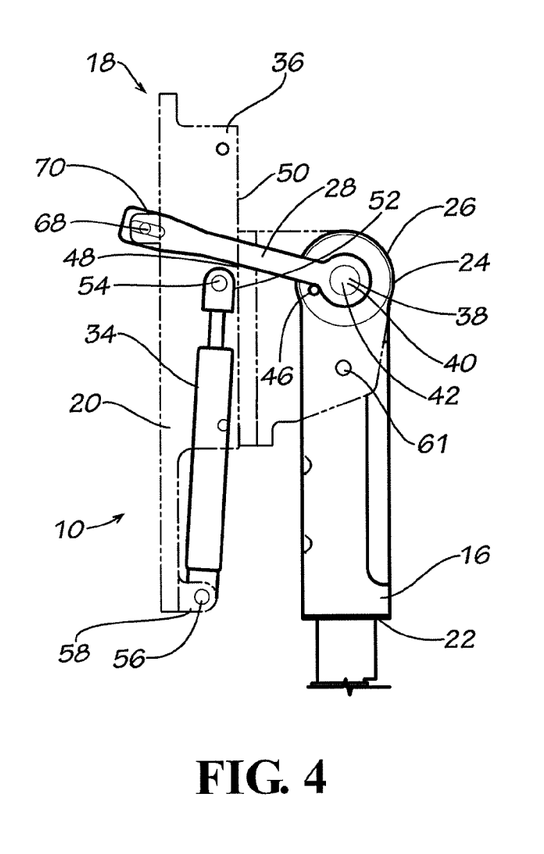
FIG. 4 is a side view of the deployment apparatus of FIG. 1 in a stowed position.
Figure 8:
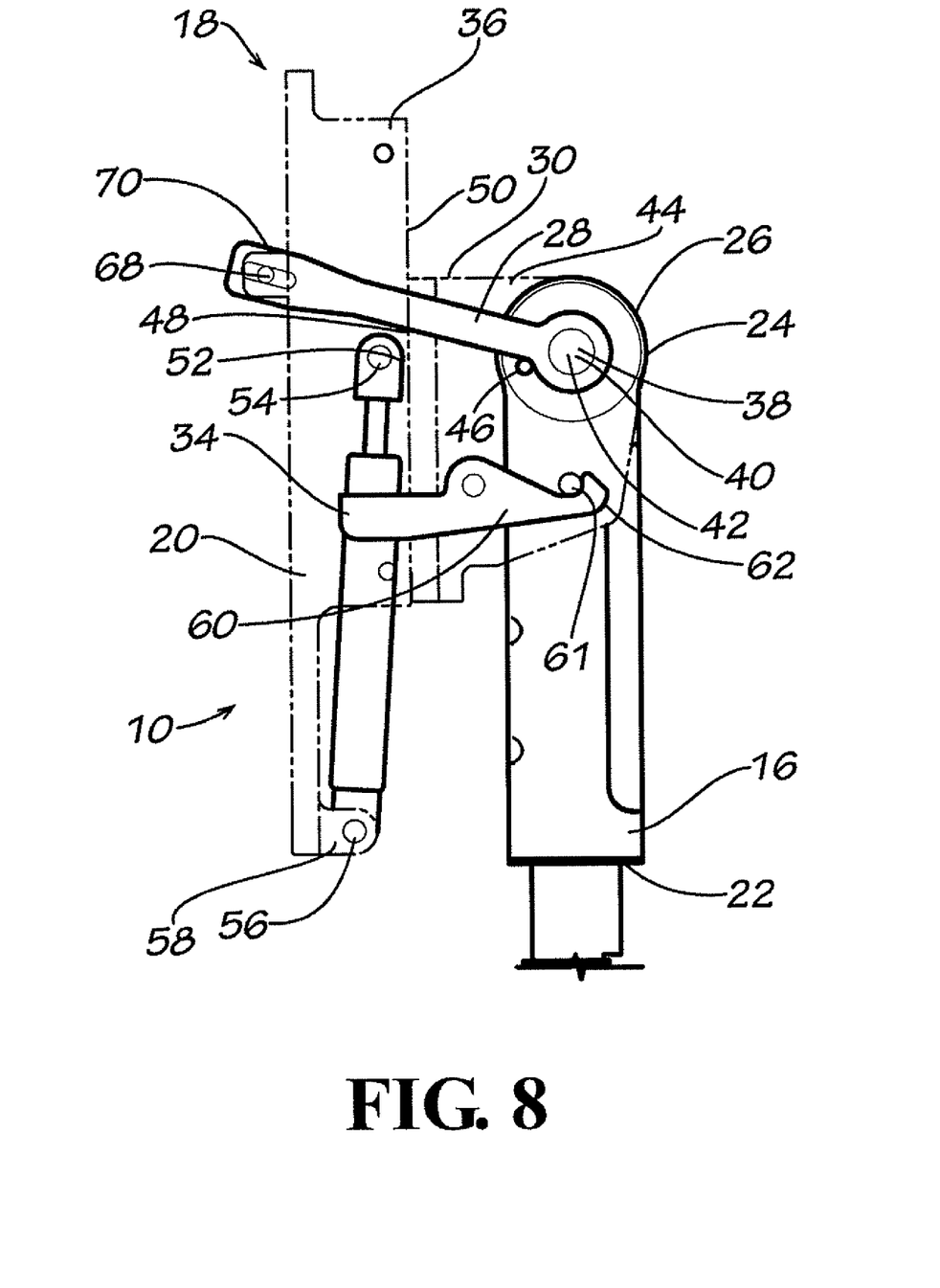
FIG. 8 is another side view of the deployment apparatus of FIG. 1 in a stowed position.

The rotation limiting pin 46 contacts the deployment link 28 over a range of angles from a stowed angle to a released angle. The stowed angle position may be defined as any appropriate angle formed between the deployment arm 16 and a vertical axis. In one embodiment, as shown in FIGS. 4 and 8, the stowed angle position is an angle of approximately 0 degrees between the deployment arm 16 and the vertical axis. However, one of skill in the relevant art will understand that any appropriate angle may be used that results in a stowed position of the deployment apparatus 10.

The released angle may range from 10 degrees to 60 degrees from the stowed angle position, and may preferably be approximately 30 degrees from the stowed angle position. When the deployment arm 16 is positioned at the stowed angle, the deployment link 28 prevents further travel of the deployment arm 16 along its rotational arc in that direction.

As shown in FIG. 3, some embodiments of an external rear surface 48 of the pivot housing 30 include a plurality of linear bearings 50. The linear bearings 50 provide a sliding surface between the pivot housing 30 and the at least two linear guides 36. In some embodiments, the linear bearings 50 include but are not limited to inserted bearings or bushings. The at least two linear guides 36 are in turn coupled to the deployment arm mount 20. In some embodiments, the linear guides 36 are integrated into the deployment arm mount 20. The linear bearings 50 and the linear guides 36 may be formed of any suitable material that does not impede the ability of the pivot housing 30 to travel along the at least two linear guides 36. For example, the linear bearing 50 materials include but are not limited to nylon, delrin, Teflon, or other similar coating materials. The linear guide 36 materials include but are not limited to aluminum, to stainless steel, other metallic material, composite material, or other similar material.

The deployment arm mount 20 may be formed of any suitable material including but not limited to aluminum, stainless steel, other metallic material, composite material, or other similar material. The deployment arm mount 20 and the at least two linear guides 36 have a length that accommodates the vertical travel distance required by the pivot housing 30 to achieve the desired reduction in swing trajectory of the deployment object 12.

The pivot housing 30 also includes a projection 52. An upper end 54 of the gas spring 34 is coupled to the projection 52 and the lower end 56 of the gas spring 34 is coupled to a projection 58 extending from the deployment arm mount 20. In other embodiments, the gas spring 34 is coupled to a link, which in turn is coupled to the pivot housing 30. One of skill in the relevant art will understand that the gas spring 34 may be coupled to the pivot housing 30 and the deployment arm mount 20 in any suitable manner including but not limited to pins, screws, or other types of mechanical fasteners.

Figure 7:
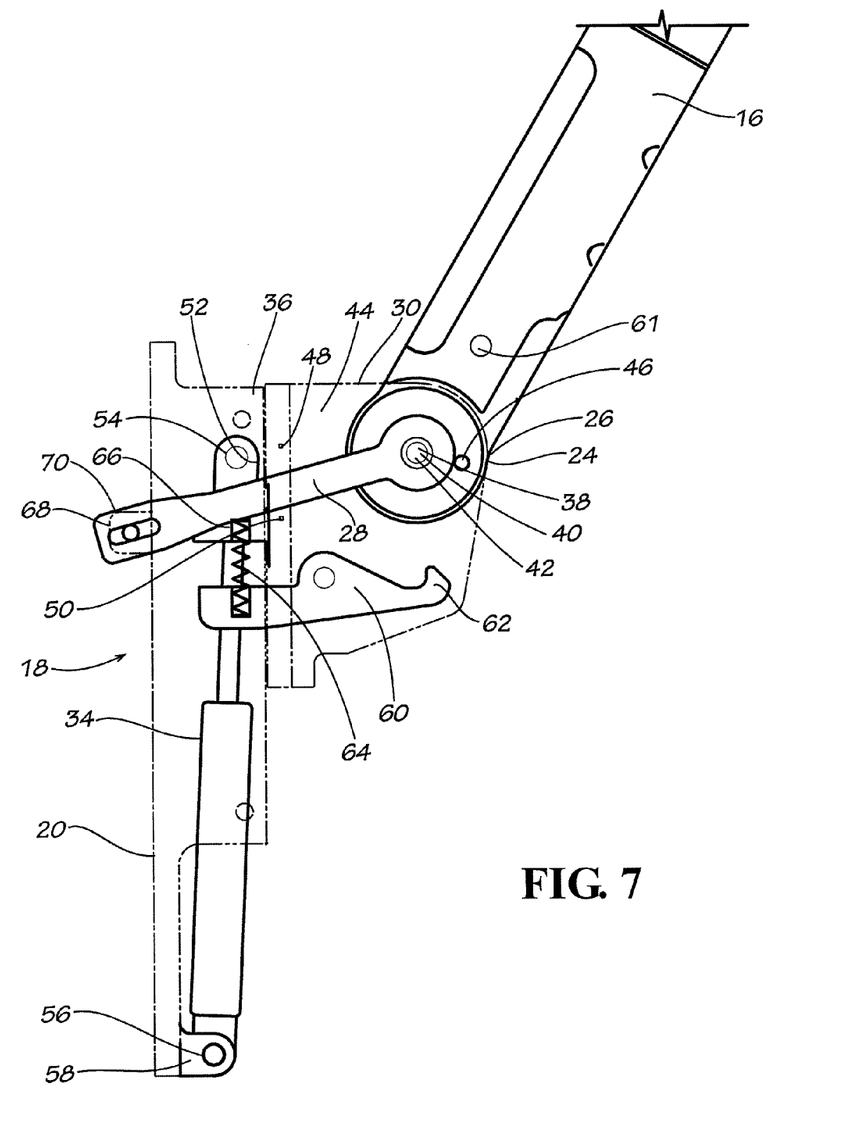
FIG. 7 is a side view of the deployment apparatus of FIG. 1 in a deployed position.

In some embodiments, as shown in FIGS. 7 and 8, the pivot housing 30 includes a locking arm 60. The locking arm 60 includes a hook 62 that is configured to engage a latch pin 61 on the deployment arm 16. The locking arm 60 is also coupled at its opposing end to one end of a spring 64. The spring 64 is coupled at its opposing end to a projection 66 extending from the pivot housing 30. The locking arm 60 releases the latch pin 61 when a passenger pulls a lever or pushes a button that lifts the locking arm 60 that is attached to the spring 64. In other embodiments, any suitable releasable mechanical fasteners may be used to releasably engage the latch pin 61.

FIGS. 4-5 and 7-8 illustrate one embodiment in which an opposing end 68 of the deployment link 28 is pivotally coupled to a projection 70 extending from the deployment arm mount 20. As a result, the end 68 creates a fixed point about which the deployment link 28 pivots. In other embodiments, the opposing end 68 may be coupled to any appropriate structure that restricts the movement of the opposing end 68.

Figure 6:
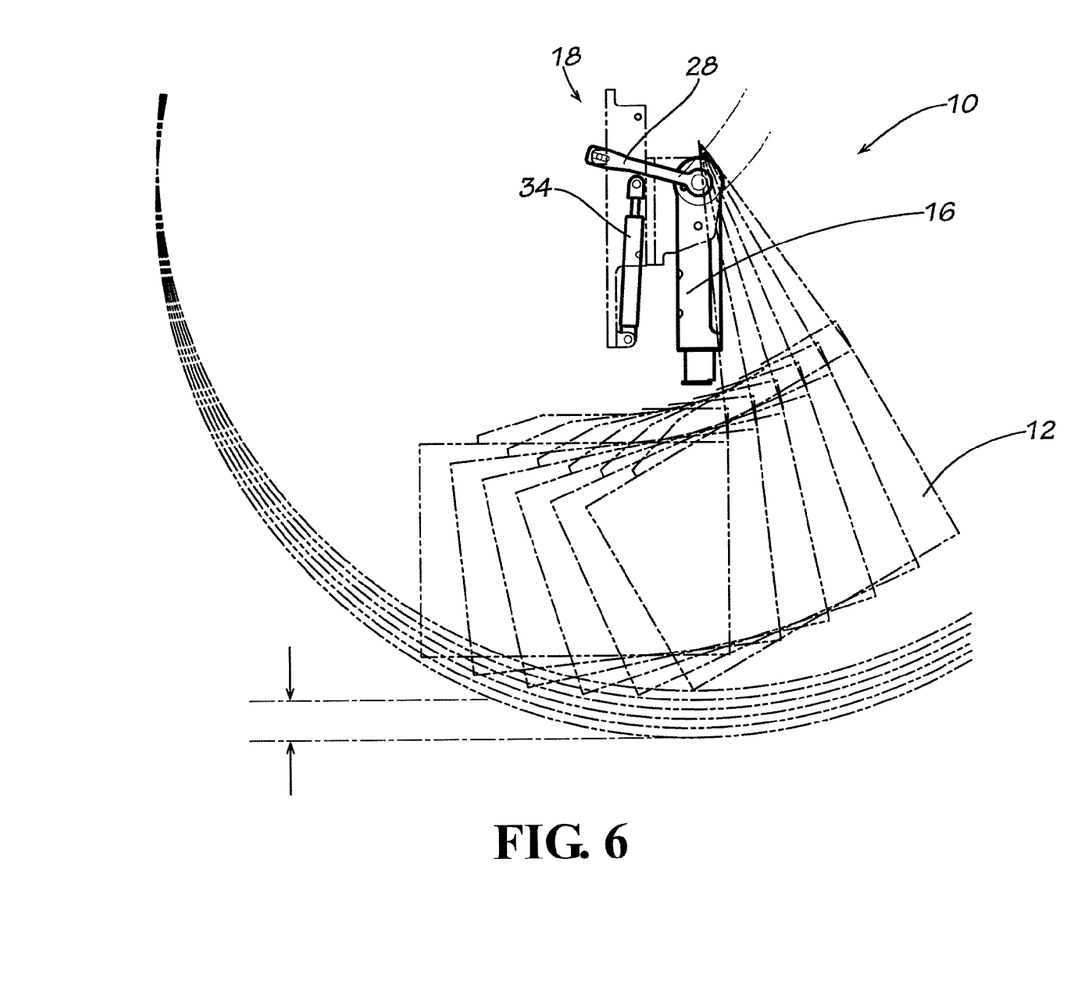
FIG. 6 is a side view showing the change in the swing trajectory of the deployment object created by the deployment apparatus of FIG. 1.

As illustrated in FIG. 6, one embodiment of the deployment apparatus 10 includes the vertical slide 18 to deploy the deployment arm 16 in an upward direction while the deployment arm 16 also rotates outward along its rotational arc. When the deployment object 12 is in a stowed position, as shown in FIGS. 4 and 8, the pivot housing 30 is located at the lower end of the at least two linear guides 36, the latch pin 61 is engaged by the locking arm 60, the deployment arm 16 is oriented in the stowed angle position, and the deployment object 12 is oriented so that the plane of the surface area 13 is substantially parallel with the plane of travel of the deployment arm 16.

Figure 5:
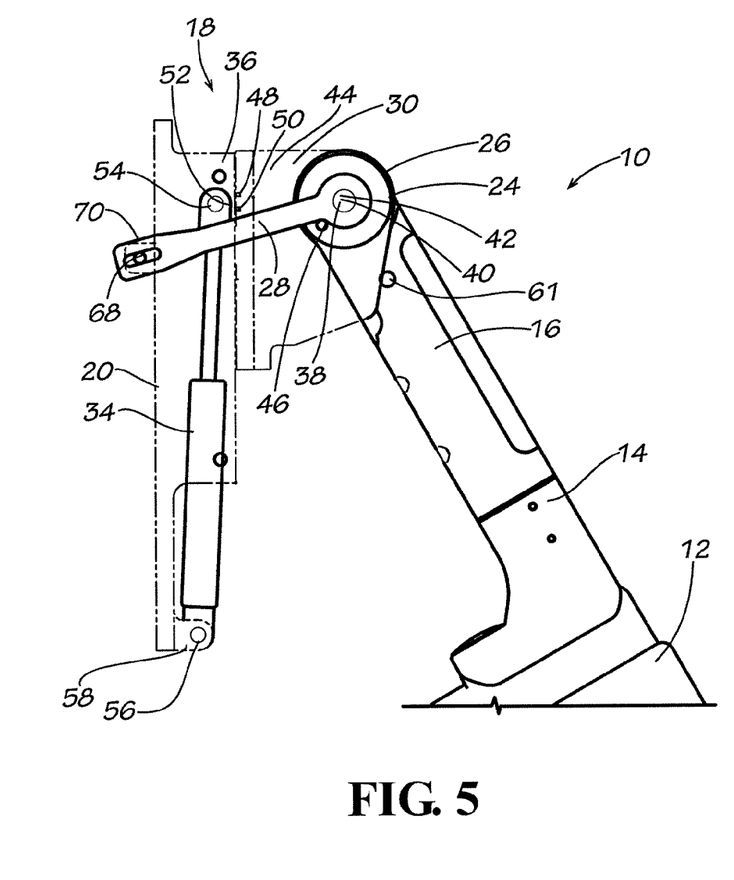
FIG. 5 is a side view of the deployment apparatus of FIG. 1 in a released position.

In the embodiments illustrated in FIGS. 1-8, a passenger releases the locking arm 60 to deploy the deployment object 12 from its stowed angle position. Releasing the locking arm 60 disengages the latch pin 61. This disengagement releases the gas spring 34, which causes the pivot housing 30 to travel to the upper end of the at least two linear guides 36. The upward movement of the pivot housing 30 simultaneously causes the deployment link 28 to press against the rotation limiting pin 46, which in turn causes the deployment arm 16 to rotate outwardly from its stowed angle position. The simultaneous upward and outward movement of the deployment arm 16 places the deployment arm 16 into the released angle position, which is illustrated in FIG. 5.

In some embodiments, as shown in FIG. 6, the slide and link mechanism creates a displaced vertical distance that may be used to create passenger seats with a lower seat cross beam or to accommodate a larger deployment object within an existing storage location. FIG. 6 illustrates that the displaced vertical distance is calculated by measuring the difference between the lowest point on a hypothetical rotational arc created by the deployment object relative to the actual lowest point along the rotational arc created by the deployment object. The displaced vertical distance is at least 0.5 inches and may range up to 3 inches, and may preferably be approximately 1.5 inches.

Once the deployment arm 16 is in the released angle position, a passenger may then manually pull the deployment arm 16 into a desired deployment angle, where the deployment angle may range from the released angle to 150 degrees, with the released angle setting controlled by the vertical slide 18. As illustrated in FIG. 7, the passenger then rotates the deployment object 12 into a deployed position for viewing.

When the passenger is ready to stow the deployment object 12, the passenger rotates the deployment object 12 back to its stowed orientation. In a stowed orientation, the plane of the surface area 13 is substantially parallel with the plane of travel of the deployment arm 16. The passenger then manually rotates the deployment arm 16 back to the stowed angle position, which causes the deployment arm 16 to simultaneously travel downward and inward while compressing the gas spring 34. The downward pressure exerted by the passenger causes the latch pin 61 to slide over the hook 62 where the latch pin 61 is then engaged by the locking arm 60.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A method of deploying a deployment apparatus, wherein the deployment apparatus comprises (i) a deployment object, (ii) a deployment arm coupled to the deployment object, (iii) a deployment link, wherein an end of the deployment link comprises a mating surface that confronts a mating surface of the deployment arm and an opposing end of the deployment link is coupled in a fixed location to a deployment arm mount, (iv) a pivot housing, wherein the pivot housing is adjacent the mating surfaces of the deployment link and the deployment arm, and (v) at least two linear guides, wherein the at least two linear guides are coupled to the deployment arm mount and comprise at least two tracks that are slidingly engaged with a plurality of linear bearings on the surface of the pivot housing, comprising the steps of:
   a. providing a gas spring, wherein the gas spring is coupled at one end to the pivot housing and coupled at an opposing end to the deployment arm mount;
   b. providing a locking arm, wherein the locking arm is releasably coupled to a latch pin positioned on the deployment arm;
   c. releasing the latch pin from the locking arm;
   d. releasing the gas spring;
   e. raising the pivot housing to an upper end of the at least two linear guides;
   f. providing a rotation limiting pin, wherein the rotation limiting pin is coupled to the mating surface of the deployment arm;
   g. positioning the deployment link adjacent the rotation limiting pin; and
   h. rotating the deployment arm from a stowed angle to a released angle, wherein the stowed angle is an angle formed between the deployment arm and a vertical axis, and wherein the released angle is an angle formed between the deployment arm and the stowed angle.

2. The method of claim 1, wherein the stowed angle has a range of 0 to 90 degrees.

3. The method of claim 1, wherein the released angle is at least 10 degrees from the stowed angle.

4. The method of claim 1, further comprising the steps of:
   i. providing a spring coupled to an end of the locking arm and a projection on the pivot housing; and
   compressing the spring by raising the end of the locking arm to release the latch pin from the locking arm.

5. The method of claim 1, wherein the deployment object is a member of the group consisting of a display monitor, a tray table, and a cocktail table.

6. The method of claim 1, wherein the deployment apparatus has a displaced vertical distance of at least 0.5 inches.

7. The method of claim 1, wherein the deployment apparatus has a displaced vertical distance of at least 1.5 inches.

* * * * *